No. 761,898. PATENTED JUNE 7, 1904.
D. NEALE.
SUBMERGED DIKE.
APPLICATION FILED JAN. 21, 1901.
NO MODEL.
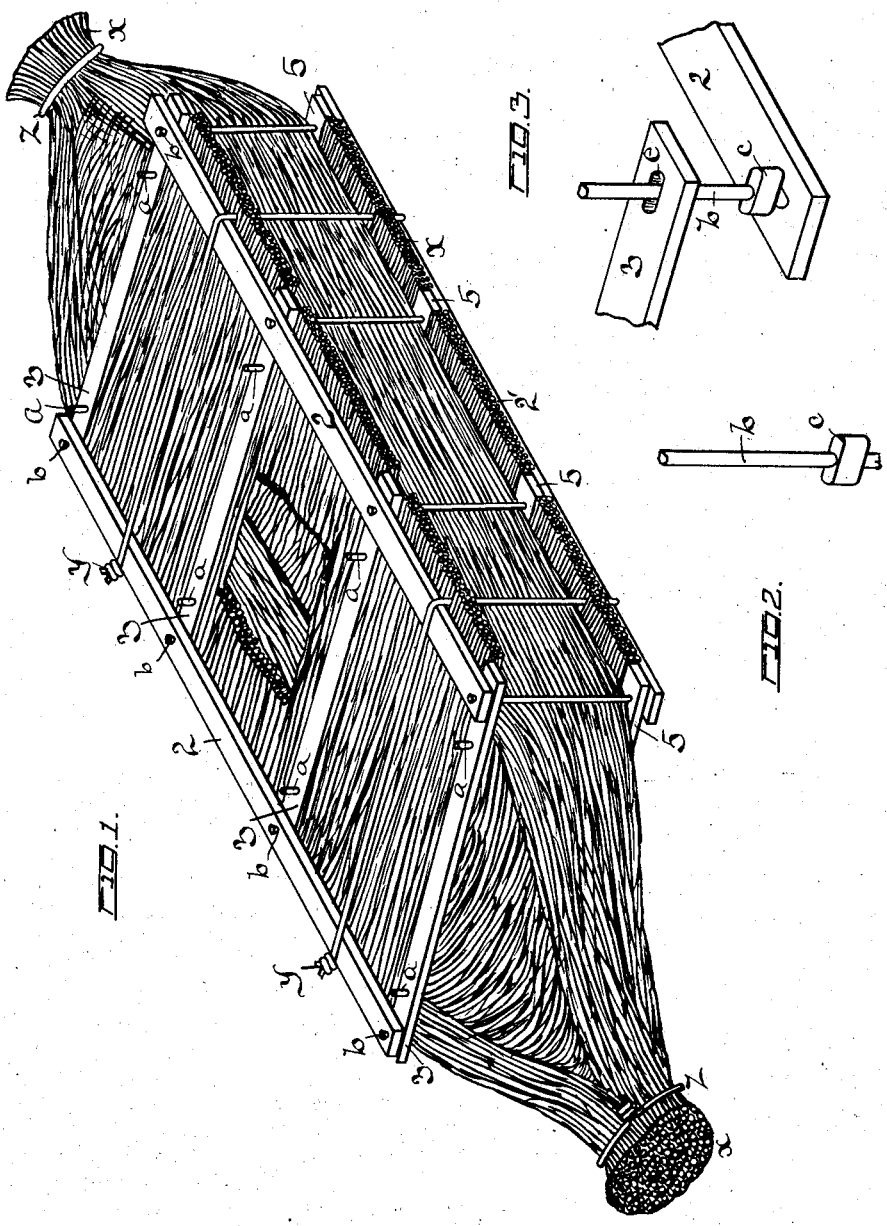
WITNESSES:
F. G. Larson.
W. E. Windsor.
INVENTOR
David Neale
Geo. W. Sues.
BY
Attorney No. 761,898. Patented June 7, 1904.

UNITED STATES PATENT OFFICE.

DAVID NEALE, OF FORT CALHOUN, NEBRASKA.

SUBMERGED DIKE.

SPECIFICATION forming part of Letters Patent No. 761,898, dated June 7, 1904.

Application filed January 21, 1901. Serial No. 44,148. (No model.)

*To all whom it may concern:*

Be it known that I, DAVID NEALE, residing at Fort Calhoun, in the county of Washington and State of Nebraska, have invented certain useful Improvements in Submerged Dikes; and I do hereby declare that the following is a full, clear, and exact description of the invention, such as will enable others skilled in the art to which it appertains to make and use the same, reference being had to the accompanying drawings, which form a part of this specification.

This invention relates to an improvement in submerged dikes, and embodies a cell of permeable material adapted to form after having been placed below the water-surface a mud-chamber.

The object of my invention is to provide a light, portable, and permeable cell forming a unit, a plurality of these cells being used to form a fascine which is lowered below the surface of the water and in course of time becomes mud and sand filled and so offers a solid obstruction to the water-currents to deflect the same. These cells when used in series may be made to form a mat or fascine or be submerged in a series or be sunk singly.

In the accompanying drawings I have shown in Figure 1 a perspective view of one of these cells. Fig. 2 shows a view of a simple fastening device, while Fig. 3 shows one of the connecting-rods.

As set forth, the aim of my invention is to provide a cell comprising a housing made up of permeable material and which is closed at both ends.

In the accompanying drawings I have shown a housing made up of a series of longitudinal sills 2 2 and two counterpart sills 2', one of which being shown in the drawings. These sills 2 2 are united by a plurality of transverse pieces 3 3, while the remaining sills 2' are united by means of the transverse frame-pieces 5 5. These frame-pieces form, as it were, the top and bottom of a cell, and the framework is made by uniting the transverse pieces 3 to the transverse pieces 5 by means of the bars $a$ $a$, which pass through suitable openings within these pieces and are nailed or otherwise secured within the transverse pieces.

Spanning the frame-section comprising the transverse pieces 5 and the sills 2' is a covering made up of brush, cornstalks, or any other suitable material, so that a permeable wall is formed, as is shown at $x$.

The sides are made up in providing a permeable mass between the bars $a$ and the bars $b$, the bars $b$ extending through the sills 2 2' and through the transverse pieces 3 and 5, and between these bars $a$ and $b$ the material is held, as will be understood in referring to Fig. 1. The brush is made to extend a considerable distance beyond the skeleton framework and is closed at each end by means of a wire $z$ or by other suitable means, as is shown, so that I provide a cell closed at both ends and made of permeable material. To further strengthen the structure, I bind the same with one or more encircling strands of wire, as is shown at $z$ $z$ in Fig. 1.

For the sake of rigidity the bars $b$, one of which is shown in detail in Fig. 4, may be provided with the lugs $c$, which work into a suitable slot $e$ within the transverse pieces 3 and 5, so that the skeleton frame is rigidly held. These frames, however, may be constructed in any suitable manner, the object of my invention being to provide a permeable cell closed at both ends, and I do not wish to confine myself to any particular shape or limit myself to any particular structure, and,

Having thus described my said invention, what I claim as new, and desire to secure by Letters Patent, is—

A cell of permeable substance having a hollow chamber and having opposite ends pointed to form an entirely-closed chamber.

DAVID NEALE.

In presence of—
GEORGE W. SUES,
R. J. DAVENPORT.